(12) United States Patent
Stelzl

(10) Patent No.: US 8,857,651 B2
(45) Date of Patent: Oct. 14, 2014

(54) SPHERICAL FILLING BODY

(76) Inventor: Thomas Kurt Stelzl, Vienna (AT)

(*) Notice: Subject to any disclaimer, the term of this patent is extended or adjusted under 35 U.S.C. 154(b) by 1182 days.

(21) Appl. No.: 12/515,854

(22) PCT Filed: Oct. 16, 2007

(86) PCT No.: PCT/AT2007/000482
§ 371 (c)(1),
(2), (4) Date: Sep. 25, 2009

(87) PCT Pub. No.: WO2008/061262
PCT Pub. Date: May 29, 2008

(65) Prior Publication Data
US 2010/0132828 A1   Jun. 3, 2010

(30) Foreign Application Priority Data

Nov. 21, 2006  (AT) .............................. A 1916/2006
Dec. 4, 2006   (AT) .............................. A 2007/2006
Jul. 3, 2007   (AT) .............................. A 1023/2007

(51) Int. Cl.
| B65D 25/00 | (2006.01) |
| A62C 3/06 | (2006.01) |
| B60K 15/077 | (2006.01) |
| B60K 15/03 | (2006.01) |

(52) U.S. Cl.
CPC ............... *A62C 3/06* (2013.01); *B60K 15/077* (2013.01); *B60K 2015/03381* (2013.01); *F17C 2260/016* (2013.01); *Y02E 60/34* (2013.01); *Y02E 60/321* (2013.01)
USPC .................................. 220/563; 141/1; 169/45

(58) Field of Classification Search
CPC  A62C 3/006; F17C 2260/016; B60K 15/077; B60K 2015/03381; B65D 25/00

USPC .............. 141/1; 220/563; 137/574–575; 169/45–46
See application file for complete search history.

(56) References Cited

U.S. PATENT DOCUMENTS

| 3,349,953 A | * | 10/1967 | Conaway et al. ............. 220/734 |
| 3,400,854 A | * | 9/1968 | Conaway et al. ............. 220/734 |
| 3,536,260 A |   | 10/1970 | Volz |
| 3,687,329 A | * | 8/1972 | Baum ........................... 220/216 |
| 3,784,050 A | * | 1/1974 | Pollack ......................... 220/734 |
| 3,804,292 A | * | 4/1974 | Chiti ............................ 220/88.3 |

(Continued)

FOREIGN PATENT DOCUMENTS

| GB | 752346 A |   | 7/1956 |   |
| JP | 09228430 A | * | 9/1997 | ............... E03B 3/03 |

*Primary Examiner* — Nicolas A Arnett
(74) *Attorney, Agent, or Firm* — Laurence A. Greenberg; Werner H. Stemer; Ralph E. Locher

(57) ABSTRACT

A spherical hollow filling body is provided for filling containers for combustible and inflammable liquids or gases. The filling body is used for preventing explosive combustion processes and explosions, for extinguishing fires, as protection against corrosion in tanks, for separating fuels and water, as protection against bacteria and fungi in fuel tanks, as protection against theft, for reducing hydrocarbon emissions, for increasing the stability and safety of tanks in the event of a crash, for reducing the boil-off effect of hydrogen, for applications in the chemical industry, for deriving static electricity from fuel containers, for protection against electromagnetic interferences, for reducing the B.L.E.V.E. effect, for increasing the filling quantity of gas containers, for heating and cooling liquids and gases, and for reducing evaporation loss. The filling body has a plurality of disk-type circular vertical surfaces and a plurality of disk-type circular horizontal surfaces which are parallel to each other.

44 Claims, 11 Drawing Sheets

(56) References Cited

U.S. PATENT DOCUMENTS

| | | | |
|---|---|---|---|
| 4,013,190 A * | 3/1977 | Wiggins et al. | 220/501 |
| 4,550,848 A * | 11/1985 | Sucato | 220/501 |
| 4,764,408 A * | 8/1988 | Stedman et al. | 428/71 |
| 4,927,045 A * | 5/1990 | Lichka | 220/88.1 |
| 4,951,704 A * | 8/1990 | Reber | 137/351 |
| 5,816,332 A * | 10/1998 | Alhamad | 169/45 |
| 5,890,618 A * | 4/1999 | Spickelmire | 220/563 |
| 5,960,981 A * | 10/1999 | Dodson et al. | 220/563 |
| 6,062,417 A * | 5/2000 | Evans | 220/563 |
| 6,308,856 B1 * | 10/2001 | Spickelmire | 220/563 |
| 6,375,030 B1 * | 4/2002 | Spickelmire | 220/563 |
| 6,431,388 B1 * | 8/2002 | Spickelmire et al. | 220/563 |
| D469,846 S * | 2/2003 | Spickelmire | D23/206 |
| 6,547,090 B2 * | 4/2003 | Spickelmire et al. | 220/563 |
| 6,698,522 B1 * | 3/2004 | Alhamad | 169/45 |
| 6,848,472 B2 * | 2/2005 | Bambacigno | 137/574 |
| D507,626 S * | 7/2005 | Bambacigno | D23/206 |
| 8,235,241 B2 * | 8/2012 | Ramsay | 220/563 |
| 8,297,460 B2 * | 10/2012 | Riordan | 220/88.1 |
| 2001/0013366 A1 | 8/2001 | Spickelmire et al. | |
| 2002/0063133 A1 * | 5/2002 | Spickelmire et al. | 220/563 |
| 2004/0063801 A1 | 4/2004 | Roehm | |
| 2004/0134916 A1 | 7/2004 | Bambacigno | |

* cited by examiner

11

12

12

12

SPHERICAL FILLING BODY

BACKGROUND OF THE INVENTION

Field of the Invention

The invention relates to an article in the form of spherical, hollow filling bodies for filling containers for flammable and inflammable liquids or gases, as well as to methods to its particularly advantageous uses, e.g. for preventing explosion-type deflagrating processes and explosions, for extinguishing fires, as a corrosion protection in tank containers, for separation of fuels and water, as a protection against bacteria and fungi in fuel tanks, as an anti-theft protection, for reducing carbon-hydrogen emissions, for increasing stability and crash safety of tank containers, for reducing the boil-off effect of hydrogen, for applications in chemical industry, for dissipating static electricity from fuel containers, for protecting against electromagnetic disturbances, for reducing and decelerating the BLEVE effect, for increasing the filling capacity of gas containers, for heating and cooling liquids and gases, as well as for reducing the vaporization loss.

Furthermore, the invention relates to methods for producing the article.

In particular for reducing the risk of explosion with fuel tanks and/or gas tanks (liquid-gas containers), it is known to use an expanded metal provided with cuts, wherein use thereof is substantially made by introducing it into the tanks or containers in the form of rolls or bales where it causes a substantial surface increase, yet occupying only a small portion of the tank volume. Originally, aluminum and/or an aluminum alloy was used as the material because it is particularly soft and can consequently be processed in a particularly advantageous manner with known methods in which the cuts are produced by cutter drums since the hardness of the cutter drums naturally delimits the choice of material. This basic principle of processing by means of cutter drums has been changed again and again during the last decades, wherein the substantial changes have primarily been aimed at optimizing the individual components of the machines, in particular stretching mechanisms (cf. EP 340 619 B, DE 2801 312 C2, and DE 3814448 A1).

Yet, practice has shown that splinter wastes and abrasion particles are caused when cutting with cutter drums which are considerably detrimental to the applications according to these patents. In particular in case of using stretched material as anti-explosion material in fuel tanks, these particles get into the fuel and together with the fuel into filter devices of combustion engines or into the engines themselves where they cause damage. To provide for remedy, EP 912 267 B already proposed to provide the cuts in the material webs without cutter drums but with cutting units emitting laser beams, water jets or electron beams, wherein several of such cutting units are fixedly arranged next to each other and transversely to the running direction of the foil web so that intermitting longitudinal cuts are performed next to each other in the web moved past therebelow in a manner that as many longitudinal lines as cutting units are provided next to each other. The advantage of this technique is that no splinters or the like particles are produced during cutting, and that no lubricants are necessary either, as would be the case with cutter drums, so that clean stretched materials can for the first time also be obtained from materials with a higher surface hardness, e.g. stainless steel. Afterwards, the material which has accordingly been provided with longitudinal cuts will be stretched, involving the serious drawback that the material web provided with the longitudinal cuts must be stretched by pulling the web apart in the width direction, thus causing a widening of the web and, at the same time, a shortening of the web in the running direction. Pulling the web apart in a manner transverse to its longitudinal direction is however only possible by means of relatively complex gripping elements for the web provided on its rim, wherein separate conveyor chains or toothed-belt lines are necessary, as they are described in the above-mentioned EP 912 267 B as well.

To overcome these and other disadvantages, with the subject matter of patent application PCT/AT2005/000392 (WO 2006/034522 A1), it has been proposed to provide the cuttings in the material web, in particular in foil-type metal webs which preferably consist of stainless metal, in the form of transverse cuts, wherein a cutting beam moves along a transverse line relative to the material web and is switched on and off so that transverse cuttings which are spaced apart, i.e. separated by material, are formed so as to achieve the network configuration desired after stretching. A similar method is also known from the US patent 2001/001986 A1.

All these methods have in common that the stretched metal produced is incorporated in the containers to be protected in the form of bales. The use of bale-type stretched metals as explosion-protection means is that the containers are filled with a block of stretched metal whose dimensions do not correspond to the internal dimensions of the container and can thus not be removed from the container or in a very difficult fashion by destroying the block. Removal of the stretched-material filling from the container can be necessary, e.g. for desired cleaning purposes or for inspection of the container's interior walls. Moreover, this technology involves the substantial drawback that the containers cannot be filled later on via small openings (e.g. fill-in nozzles). This is why it has again and again been proposed to produce small filling bodies from stretched metal, and to subsequently introduce them into the container openings. For example, from GB-20 28 129 it is known to use squares, rectangles, cylinders or spheres made of stretched metal for this purpose. The methods of producing such spheres are similar since the starting material for the production is always an already produced stretched metal from which spherical or ellipsoidal bodies are formed in different manners (cf. DE 381 6792 C2, EP 0 486 464 A1, EP 0558 163 B1, AT 389 479 B, WO 1993/008361).

Yet, practice has shown that no perfect result can be achieved by any of these production methods since the filling bodies which are always produced from stretched metal are no spheres but at the best spherical compressed bodies whose tendency to get stuck by jamming of the upward-turned or pressed gap rims of the stretched metals can at least not fully be excluded with the reliability necessary. The spherical compressed bodies produced by the known production methods have rough, and not smooth, exteriors. This is why these spheres do not reliably roll on each other and one can consequently never be sure whether the spheres reliably fill the container to be protected completely. Firm bridges may form inside of the tanks which enable formation of cavities. This bears a considerable risk since there must not remain any cavities inside of the tank so as to provide for proper explosion protection. Furthermore, in particular aluminum filling bodies tend to strong abrasion with respect to each other due to their rubbing contact when they have been introduced into a container. Moreover, it has proven that these spherical compressed bodies of pressed and shaped stretched metal do in no case permanently have the shape stability or strength necessary against gas or liquid-pressure peaks so that the spheres filled into gasoline tanks will nest after longer periods of use, and the tank is thus no longer entirely filled up to an extent necessary for explosion protection. Furthermore, these filling bodies are unstable so that filling into the tank by means of a blow-in device, and in particular sucking the filling bodies off the tank may produce damage to the filling bodies and deform the same.

To allow for a better filling with such filling bodies made of stretched metal, it has become known to surround the filling bodies with a liquid-soluble foil which encloses the filling body during filling, and will dissolve some time after having contacted the fuel liquid (e.g. gasoline) without any residues so that only the filling bodies will remain in the container interior. In general, the substantial disadvantage of filling bodies made of expanded metal however is that they are produced according to the respective method by compressing, and shaping, stretched metal, wherein this principle of production does not allow for the geometrical properties (precise displacement, volumes, etc.) of the produced filling bodies to be defined by calculation in a precise and binding manner. Yet, practice has shown that this is the essential criterion for potential wholesale customers to use such an explosion protection. A producer of planes must know, e.g. the precise weight of the explosion protection to be installed, and the precise volume displacement. He must be sure that the filling bodies filled-in can again be sucked off the filled tank and refilled with the same properties. Moreover, any risk of corrosion or abrasion shall be avoided reliably.

These elements of uncertainty for the users and clients are the reason why the filling bodies made of stretched metals could so far not reach a broad and worldwide market-penetration although the idea was placed on the market three decades ago. Particularly the fact that the filling bodies made of expanded metal and produced according to the above methods have a not insignificant flow resistance leads to serious disadvantages as regards their ability of being flown-through by liquids or gases. In general, the entire method in which expanded metal is used in the form of network-type bales and in the form of filling bodies made of these networks involves the further substantial drawback that the applied physical principle of surface increase and/or flame cooling tends to prevent only an explosion but does not prevent a fire or provide for extinguishing of the same.

BRIEF SUMMARY OF THE INVENTION

It is now an object of the present invention to provide a filling body which is substantially more effective than known products, not only as regards prevention of explosions in fuel tanks but also extinguishing of surface fires, as well as meeting the requirements of a number of other cases addressed hereinafter whose subject matters and advantages will be evident from the following description. To achieve this object, the present invention provides for the design of a novel spherical, hollow filling body itself as well as for methods of producing this filling body, as defined in the enclosed independent claims. Advantageous application methods are set forth in the dependent claims. The invention aims at providing methods of the initially-defined type which allow for the production of precisely defined and completely identical filling bodies which have ideal properties and are made of the material suited best for the respective specific purpose of use and do not involve the mentioned disadvantages of filling bodies made of expanded metal employed so far.

The object is achieved by the filling body set forth in the claims. An advantage of the filling body described is that it has the spherical shape with an absolutely smooth surface which is ideal for the methods defined in the claims, and the filling bodies described roll on each other perfectly and fill a container completely with the most possible reliability. There will definitely not be any bridge formation by jamming of the filling bodies described. The production methods described in the claims allow for the properties of the described filling body to be precisely adapted to the respective purpose of use, and for identity of all filling bodies. A further advantage of the described filling body is that is has as low a volume displacement and weight as possible. Although the containers must be completely filled with the inventive filling bodies, the described filling bodies must have such a high portion of cavities that the capacity for the liquid contents of the container will be reduced as little as possible when filling with the filling bodies described, wherein values of from 1 to 5% are usual, e.g. To achieve this, all filling bodies described must be of exactly the same size, shape, density and weight. An advantage of the described filling body is that it has as high a conductivity (temperature and electricity) as possible, and a high-strength stability. Thus, it is ensured that the loss of volume in the container filled with the described filling bodies does not amount to more than 1 to 5% of the volume, and that the weight increase of the filled container is negligible compared to the advantages of the filling body described. Moreover, it is ensured that the high stability of the described filling bodies prevents parts of the described filling body from failing under the load of the liquid or gas surge (liquid and gas-pressure peaks) and/or under the load of the weight of the described filling bodies lying one above the other. Another advantage of the described filling body is that it has as large a surface as possible despite its low volume displacement. The filling body described forms as large a surface as possible but has a structure which provides for as little a pressure loss as possible. Another advantage of the filling body described is that it is optimized in terms of flow such that it has a flow resistance against liquids or gases which is as little as possible, irrespective of how the described filling body comes to rest with the described filling bodies within the entire filling provided in a container. Another advantage of the described filling body is that a continuous cavity in the described filling body allows for smooth integration of a hollow body in the latter. Thus, the invention suggests storing a fire-retardant or fire-extinguishing substance or an electronically active or passive transponder in this hollow body. Moreover, the invention suggests producing the hollow body in the described filling body from a fire-proof and buoyant foam material so as to thus use the hollow body as a buoyancy body for the filling body described, and to thus provide the latter with buoyancy. As is shown in FIGS. 1, 2, and 3, the disclosed properties of the described filling body allow for eliminating the disadvantages of the known cylindrical and ellipsoidal filling bodies made of stretched metal, as illustrated in FIG. 5 by reference number 12, and in FIG. 6 as spherical filling body 13 made of stretched metal. The known filling bodies made of expanded metal, as shown in FIG. 4 by reference number 11, have the tendency of getting stuck, in particular when they are introduced in geometrically twisted tubes. In FIG. 7, a tube 14 is shown into which filling bodies 15 conventional so far and made of stretched metal are filled, causing an accumulation of the filling bodies 15 in the tube in the bent 16 in the region 17. The inventively described filling bodies eliminate this risk. Thus, FIG. 8 shows a tube 18 into which the inventively proposed filling bodies 19 are blown in direction 21, with no accumulation of the proposed filling bodies 19 being caused at the tube bent 20 by jamming so that the filling bodies 19 will move further on in the direction 21 with no obstacles. The particularly advantageous use of the inventively proposed filling bodies is specifically evident from FIG. 9. Here, the inventively described filling bodies 23 are introduced into a tank container 24, which is filled with a fuel 25, via a fill-in tube 22. Introducing thereof is simplified by the particularly advantageous shape and properties of the inventively described filling bodies so that, as is illustrated in FIG. 10, the inventively described filling bodies 28, e.g., can smoothly be filled into the present tank opening 26 of a passenger car by means of a blow-in device 27 (here, only the fill-in nozzle can be seen). An essential component of the inventively proposed filling body is the cavity 30 of the inventively proposed filling body 29, as is illustrated in FIG. 11. As shown in FIG. 12, this cavity provides for the possibility of integrating a hollow or solid body 31 into the inventively proposed filling body 29.

Other subject matters and advantages will be evident from the following description.

It is known that three essential elements must be present for causing an explosion inside of a tank container, namely pressure, an ignitable mixture of fuel vapor and oxygen, as well as an ignition pulse. In many containers which include liquid and explosive substances, in particular when they are only partly filled with liquid, there is mostly a mixture of fuel vapor and oxygen, and the risk of a pressure building up so that an explosion may be caused by an accidental ignition pulse or by overheated container walls. This is why the invention suggests complete filling of existing containers which include liquid and explosive substances, e.g. fuel tanks, with the inventively described filling bodies, either during construction or thereafter. If such a container filled with the inventively described filling bodies ignites, there will be no explosion of the explosive gases accumulated in the container's clearance since the inventively described filling bodies will provide for a normal and controlled combustion of the explosive gases accumulated in the containers free space, and for a cooling of the flames.

In a novel method of another embodiment of the invention, it is also of particular advantage that a fire-retardant active substance in a wax container is integrated into the described filling bodies. Thanks to this integration of a fire-retardant active substance, a problem which is associated with the use of explosion-preventing filling material, and to which no solution has been provided so far can be solved for the first time and in a simple manner. For example, in case that a fuel-filled tank car is involved in a crash, its tank fails and gasoline escapes, an expanded metal installed in the tank would—for the time being—prevent the tank car from exploding but it would not prevent an, e.g., escaped fuel from igniting outside of the car and burning. In this event, the fire-retardant active substance in the described filling bodies would react and extinguish the fire. To this end, e.g. a preferably polymer-based fire-extinguishing gel is put into a hollow body having an outer sleeve made of wax which melts at a certain temperature and releases its contents, i.e. the polymer-based fire-extinguishing gel. Further fire-retardant fillings may be sodium bicarbonate, zinc or sodium borate, calcium bromide, calcium-chloride dihydrate, calcium-chloride hexahydrate or oleates (salts and esters of oleic acid).

In a novel method of another embodiment of the invention, it is also of particular advantage to coat the inventively described filling bodies with alkaline bichromate so as to remove water in fuels. Here, the problem is addressed that water is undesirably present in fuels, e.g. in the maritime field in diesel, and detrimental to the downstream engine. In this context, the prior art discloses to remove the water by means of a separator and a filter. The present invention is however easier. In this respect, a coating of the inventively described filling bodies with alkaline bichromate is to be regarded as particularly effective since the included bichromate causes removal of water from fuels and their containers.

In a novel method of another embodiment of the invention, it is likewise of particular advantage to provide the described filling bodies with buoyancy, and to therefore create certain chambers within the filling bodies described in which products having certain properties can be introduced after completion of the filling bodies described. Here, attention has to be paid to the introduction of a floating body (buoyancy body) made of inflammable material. In this further embodiment of the invention, the integration of the buoyancy body as floating body made of a fire-proof material provides for the possibility of using the described filling bodies not only for complete filling of the fuel container but for protecting in particular storage tanks, e.g. in refineries and at airports, and to thus protect also containers against explosions by covering the surface of the explosive liquid stored completely with buoyant inventively described filling bodies in one or several layers. This creates a reliable flame and ignition barrier between the liquid and the gas-air-mixture space thereabove. Moreover, fires can be extinguished by arranging large numbers of spheres, or spherical bodies, across the entire burning surface, thus quenching the fire. Here, the fire-extinguishing ability of the inventively-produced spheres, or spherical bodies, is based on the phenomenon that the flame on the surface of the burning material does not penetrate the filling bodies described. In case of a normal fire, the heat of the burning material causes the material to evaporate on the surface and to mix with the oxygen in the atmosphere there above so as to produce a flammable mixture. If the inventively described filling bodies are arranged between the surface of the burning material and the atmosphere, the heat conductivity of the described filling bodies will reduce the heat of the fire, and thus the amount of vapor generated. Furthermore, the described filling bodies prevent the flames on the surface of the burning material from reaching the flammable vapor-atmosphere mixture above the fire, thus acting as ignition barrier. In a further use of the present invention, it is likewise of particular advantage to integrate fire-retardant fillings, e.g. oleates or chemically similar compounds, into the described filling since oleates, in case of fire, generate a dense vapor which covers the burning material, thus promoting quicker flame quenching.

In a novel method of another embodiment of the invention, it is likewise of particular advantage to install the described filling bodies in air conditioner shafts, dome shafts, and tubing and pipelines. Here, they prevent the risk of a "through-ignition" of explosive gas-air mixtures by acting as permanent air and gas-permeable ignition and flame barrier. To this end, only parts of the shafts and lines, or the entire shaft and the entire line, can be filled with the described filling bodies according to the present invention.

In a novel method of another embodiment of the invention, it is likewise of particular advantage to install a special type of the described filling bodies, i.e. described filling bodies having integrated a material which swells strongly in case of heat, into air conditioner shafts, dome shafts, tubings and pipelines. Here, they do not only prevent the risk of a "through-ignition" of explosive gas-air mixtures by acting as permanent air and gas-permeable ignition barrier but they also prevent extension of the smoke gases, which are highly toxic and produced in case of fire, by the material integrated in the described filling bodies swelling strongly thanks to the heat impact of the fire, thus sealing the entire space to be protected in an air-tight manner. To this end, only parts of the shafts and lines, or the entire shaft and the entire line can be filled with the described filling bodies according to the present invention.

In a novel method of another embodiment of the invention, it is likewise of particular advantage to use the described filling bodies in shafts of air conditioners, e.g. in hospitals, as a bacteria barrier. To this end, the described filling bodies are to be coated with an antibacterial and antifungal layer, e.g. made of noble metal. The thus-coated filling bodies eliminate the bacteria and viruses present in the air flow when contacting the same, thus constituting an effective possibility of preventing extension of so-called "hospital germs" through the air conditioner of a hospital building. Thanks to their particular construction the described filling bodies can be sucked off, cleaned, and reintroduced into the air conditioner in case of contaminations.

In a novel method of another embodiment of the invention, the integration of an active or passive trans-ponder into the inventively described filling bodies offers the following, further particular advantages. The RFID (radio frequency identification) technology has already been used, in particular for identifying goods or animals, as well as for contactless ticketing systems, e.g. reloadable tickets for public transport. This already known RFID technology allows for information on marked objects to be exchanged electronically in a quick and simple manner without any physical contact. An RFID system consists basically of a reader and a transponder. It is already known from the prior art that such a transponder may consist of an electronic memory as well as of a receiving-transmitting aerial, and may be integrated in a paper label ("smart label") or a solid housing ("TAG"). The core of the transponder is the electronic memory which serves as the information carrier proper. Data can be stored on this chip whose size is that of a grain of sand, the data allowing not only for identification of each class of goods, as is the case with known bar codes, but for identification of each individual piece of goods, e.g. Reading of information stored on the chip, and writing information onto the chip, can be realized by means of transmitter fields, either via reflexion of radio-frequency signals, by means of induction in magnetic fields, or by means of image charge in electric fields. Basically, there are two types of transponders: active transponders which have their own energy supplied by batteries and which generate their own electromagnetic waves, and passive transponders which are supplied with energy by the readers during reading and writing processes. It is known from the prior art to integrate common transponders into glass cylinders, plastic panes, and check cards, e.g. For example, they are also attached to transport containers, gas bottles, beverage barrels, cooling and mobile containers, and refillable bottles or provided therein as is the case with live objects (e.g. labeling of dogs and cats). It was the car industry that has had a substantial share in paving the way for the RFID technology since this technology has been used in particular for production control and monitoring. Yet, the advantageous possibility of using the RFID technology as an anti-theft protection for locking single-track and multi-track vehicles has gained increasing importance. In this context, the transponder is fixedly connected with a certain component of the single-track vehicle, e.g. with the vehicle frame, and of the multi-track vehicle, e.g. with the bumper. Stolen motor cars are registered in a central data base available to the police and car workshops. The trans-ponders react automatically to readers of the police and employees of the car workshops as soon as they are in their vicinity. Here, it has proven to be disadvantageous that professional thieves have been gaining increasing knowledge of these systems, and exchanging certain components of the stolen vehicle, e.g. the bumper, in case that they identify an attached transponder or only believe that a transponder is attached. Moreover, it is difficult for the layman consumer to subsequently attach described RF transponders since thieves will particularly easily identify the transponders the consumers have attached, e.g. have sticked on the wheel housing of the vehicle. It is now the object of the present invention to suggest a particularly advantageous place of attachment of such an RF transponder. To achieve this object, the present invention also advantageously provides for integration of an active or passive transponder into the filling bodies described. As already mentioned above, the inventively described filling bodies according to claims 1 to 32 are basically to be used as means for the subsequent filling of already existing containers which include, e.g. liquid explosive substances, such as fuel tanks, via an already present fill-in opening. Here, it is of particular advantage to arrange the transponder within the single-track or multi-track vehicle so that the thieve who wants to steal this vehicle can reach the trans-ponder only by destroying the plastic or metal fuel tank. However, experience has shown that such a thieve is never interested in performing such complex operations on the stolen vehicle. The described filling bodies can be introduced subsequently into a fuel tank at any time via suitable blow-in devices. If explosion protection of the container is desired, the entire container will have to be filled with the described filling bodies according to the present invention. Here, it is sufficient to provide only some of the described filling bodies with a transponder so as to allow not only for explosion protection but also for its advantageous use of identification. If this explosion protection was however not desired, it would also be possible, and reasonable, to introduce only one or several of the described filling bodies into the tank—as a means for housing a transponder. In general, a single described filling body together with a single transponder would already be sufficient—yet, for safety reasons, the invention also suggests introducing several identical inventive "transponder filling bodies", depending on the purpose of use and the size of the container. Furthermore, it is of particular advantage that a number of data can be stored on the transponder which may not only serve the purpose of anti-theft protection but also of environment protection, e.g., or which may also include information on compulsory maintenance works and safety parameters of the filled container. Thus, it may be of particular advantage to fill, e.g., wing tanks of planes, with the inventively described filling bodies, and to store important safety-relevant data on the plane by means of the introduced transponder spheres, or filling bodies, according to the present invention.

Thanks to the inventively-produced transponder filling spheres introduced into the tank, the police can identify stolen cars by means of hand-operated readers during inspections. Likewise, a fully automated detection is possible, e.g. at borders or certain highway sections by installing so-called "Scan Gates" on either side of the road. These "Scan Gates" are invisible radio gates which check the transponder signal when the gate is being crossed, and trigger an alarm in case of a vehicle registered as stolen. Moreover, a reader can be installed, e.g. in a vehicle of the police (highway police) so that other vehicles can be checked when they are passing by.

In a novel method of another embodiment of the invention, it is likewise of particular advantage to completely fill fuel tanks of vehicles (aircrafts, vessels, and ground vehicles), as well as storage tanks in chemical and petrochemical industry, and fuel-storage tanks, with the described filling bodies according to the present invention so as to considerably reduce the essential problem of hydrocarbon emissions (so-called "greenhouse gases") into the environment, for the first time in a completely new fashion. When fuels are not or only partly combusted in the engine, hydrocarbons are released via the exhaust pipe. In addition, considerable amounts of hydrocarbons are released into the atmosphere by gasoline vaporization. Hydrocarbons vaporize, e.g., from the tank and other fuel-guiding components of the vehicles (fuel lines, carburetor, filters, jerry cans, etc.), as well as during filling of the fuels into the tank of a gas station and during filling thereof from the tank of the gas station into the vehicle tank. HC vaporization emissions are caused, e.g. by pressure differences in the gas space of the fuel containers and the carburetor float chamber of the vehicles. When the car is not moving, they are generated over day by the temperature course as tank-breathing emissions, and they are generated when vehicles are turned off with hot engine after long driving distances and warm engine after short driving distances. Also when a tank, e.g. a plastic tank, is obviously completely closed (tank lid screwn in), it is not sealed since the plastic usually used for the tank, namely HPDE, is indeed permeable for hydrocarbons at the molecular level, and these pollutants diffuse into the environment. The enrichment of HDPE with fuel is likewise a problem as regards recycling since the walls of the tanks get "soaked" with hydrocarbons, and a thus-contaminated container is hazardous waste and cannot be disposed of by granulation. Knowledge of this fact has led to strict law amendments in many countries, in particular in California. The admission, and thus the sell, of vehicles in California depends on the emission of these hydrocarbons. This applies not only to the fuel tank and its feed and discharge lines but to the entire vehicle. These requirements have also become more and more binding in Europe so that the choice of material has gained increasing importance in development and production of fuel tanks. The problem of substances released into the atmosphere by vaporization and volatilization does not only apply to fuel tanks of passenger's vehicles but also to all kinds of movable and non-movable storage tanks of chemical liquids and fuels. "Volatile organic compounds" (VOCs) is the general term for organic, i.e. carbon-containing, substances which evaporate easy (are volatile) and/or are also present at low temperatures (e.g. room temperature) in the form of a gas. In the likewise very often used abbreviation NMVOCs (non-methane volatile organic compounds), the gas methane is not part of the group of VOCs. The term "volatile" implies that the substances belonging to the VOC group evaporate quickly (volatilize) due to their high vapor pressure and/or their low boiling point. According to the WHO, volatile organic compounds are classified according to their boiling point and the volatileness resulting therefrom. However, there is no uniform definition of what a VOC indeed is. Some definitions do include information on the vapor pressure, other, usually newer, definitions classify VOCs by their photochemical reactivity as so-called precursor substances for the formation of near-ground ozone. Moreover, in some VOC definitions, certain organic substances are explicitly excluded. To solve this problem, the present invention advantageously provides either for complete filling of the fuel tanks of vehicles (ground vehicles, vessels, and aircrafts) and storage tanks with the inventively described filling bodies, or for covering the surface of the liquid to be stored with several layers of described "floating" filling bodies according to claim 44 so as to reduce evaporation, vaporization and volatilization of the liquids (e.g. gasoline) stored in vehicles (ground vehicles, vessels, and aircrafts) and storage tanks, and thus also emission of hydrocarbons from these vehicle and storage tanks into the environment. The particularly advantageous effect of the inventively described filling bodies is that they delay and reduce evaporation, vaporization and volatilization of liquids considerably since the strong heat dissipation of the described filling bodies leads to decreased volatilization, and additionally to a recondensation of the gases on the described filling bodies in the container.

In a novel method of another embodiment of the invention, it is likewise of particular advantage to completely fill vehicle containers (of aircrafts, vessels, spacecrafts, and ground vehicles) which contain liquid and gaseous fuels, tubings and pressure containers with the inventively described filling bodies so as to increase stability of the walls of the filled container against impacts from the outside. Force impacts from the outside on tank or storage containers caused in case of an accident are a considerable risk since they may result in penetration damages to, or indentations in, the tank or storage containers. A further problem is the risk of an implosion when emptying tank containers, e.g. mineral-oil tank cars, without forced ventilation systems. Here, the emptying of the tank-container content generates an internal negative pressure, and the prevailing external positive pressure of the atmosphere load will result in a sudden collapse of the tank container. The same applies to tubings and pressure containers which are not vacuum-proof and whose safety valve is failing. This is why the invention suggests filling of the complete container with the filling bodies described according to the present invention. In case of penetration damage or implosion of the tank outer shell, this complete filling will create a "counterpressure" used by the described filling bodies to counteract the force acting from the tank exterior on the tank center.

In a novel method of another embodiment of the invention, it is likewise of particular advantage to install the described filling bodies in fuel tanks and tanks with chemical liquids and gases as a protection against explosions and deflagrations in case of repair works, and to completely fill the tank to be protected with the inventively described filling bodies. Yet, repair works on filled or emptied but uncleaned tank containers pose a considerable risk since flying sparks may be generated during repair works (e.g. welding operations) and, consequently, also explosions or deflagrations of explosive gas-air mixtures in the tank may be caused. According to the prior art, such tanks have so far been emptied completely before start of the repair works, and residues on the tank interior walls have had to be removed thereafter. This is why the invention suggests filling of the entire tank with the inventively described filling bodies. The high heat conductivity of the filling bodies described according to the present invention neutralizes each flying spark based on the principle of surface increase, and there will be no ignition of an explosive gas-air mixture. Thus, riskless repair works are also possible in case of an explosive gas-air mixture in the fuel tank.

In a novel method of another embodiment of the invention, it is likewise of particular advantage to install the described filling bodies for decelerating volatilization of hydrogen in hydrogen tanks, and to completely fill the tank to be protected with the inventively described filling bodies. The storage of hydrogen is a considerable problem. Despite the complex and multiple insulation of the hydrogen tank, the hydrogen, which has been tanked at −253° C. (−423, 4° F.), starts already after a short period of time to heat and to consequently volatilize (the so-called boil-off effect). At present, the loss is up to from about 4 to 6% per 24 hours. This known problem is one of the main obstacles for worldwide use of hydrogen as fuel for vehicles. This is why the invention suggests filling of the entire hydrogen tank with the filling bodies described according to the present invention. The filling bodies described decelerate and reduce evaporation of hydrogen considerably since the strong heat dissipation of the described filling bodies leads to a reduced hydrogen vaporization and, moreover, to a hydrogen recondensation on the described filling bodies in the closed container.

In a novel method of another embodiment of the invention, it is likewise of particular advantage to use the inventively described filling bodies as filling bodies in chemical industry. It is known that filling bodies promote spreading of the media (water, vapor, gas, etc.) surrounding them. In large pools or towers, these filling bodies are used to change the media surrounding them (wash, transform biologically, condensate, etc.). Such filling bodies are employed, e.g. for rectification under vacuum and normal pressure, absorption, stripping, extraction, vapor condensation and regenerative heat exchange. Depending on the purpose of use, such filling bodies are installed in tubing or columns in a loose manner and horizontally or vertically. Such installations are referred to as "packages". Here, it is helpful to have large surfaces with low flow resistance, in particular when installing filling bodies in cooling towers or in static mixing devices. Static mixing devices are always used when gas and/or liquid flows shall be merged in a fashion as homogeneous as possible and with as little pressure loss as possible. For example, such static mixing devices are often used when producing caustic-soda solution mixtures of certain concentrations and for mixing gases for ensuring a constant temperature. A "filling-body column" is a separation column in chemical industry which is filled with filling bodies in a loose manner. Here, the filling bodies rest on perforated column plates in a loose fashion, with vapor flowing through the latter. As a rule, the gaseous media flow through such columns from bottom upwards, and the liquid in the counterflow flows from up downwards, in particular in transverse or parallel flow to each other. The inventively described filling bodies can replace the filling bodies used so far in an advantageous and inventively novel manner and have essential advantages over the system used so far. Thus, it is ensured that the risk of a vertical nesting of the filling bodies which may lead to bridge formation and/or formation of dead zones is reliably prevented. Moreover, the inventive filling bodies can be manufactured from high-heat-proof metals, thus resisting considerably higher temperatures than the hitherto-used filling bodies made of polypropylene, PVDF and heat-stabilized polypropylene. Thus, the inventive filling bodies are advantageously suited for different operational conditions and adaptable to their respective task. When using the inventive filling bodies, their surface which is large and, at the same time, provides for low flow and pressure loss is of particular advantage. Thanks to their insensitivity to contaminations and incrustments, they are perfectly suited for being used with solid-matter-charged liquids.

In a novel method of another embodiment of the invention, it is likewise of particular advantage to provide the described filling bodies with antibacterial (against viruses and bacteria) and/or antifungal (against fungi) properties, depending on the specific purpose of use. On the one hand, this may be realized in that already the metal of which the described filling bodies consist have these desired properties, or in that the described filling bodies are provided with an appropriately effective coating (e.g. by coating the surfaces of the described filling bodies with noble metal). This allows for a large and worldwide problem in the field of storage and fuel tanks (in particular in the maritime field) to be solved in a simple manner and without use of chemical additives. Here, it is about prevention of negative effects of bacterial decomposition processes in fuels which are caused by introduced pathogens or condensation water, also referred to as the so-called "diesel pest". In this context, it is known that infestation of lubricating-oil and diesel-oil tanks with such microorganisms may also occur at each tank filling through tank ventilation and any other contamination. The microbiological infestation consequently leads to losses in the quality of the diesel and lubricating oil. Moreover, the metabolic products of the organisms destroy the material of filter elements, tubes and particularly of tank walls. For example, it is known that a metabolic product of the organisms, namely sulfur hydrogen, considerably supports corrosion, a microbiological mucus will consequently be formed, clogging the tubes, injection pumps and filter elements. In the prior art, attempts have been made to protect, e.g., the diesel fuel against an increase in water concentration, the water constituting the basis of infestation of microorganisms and their propagation, by providing filters and water separators (most often combination elements which consist of a filter layer and a phase separator/coalescer element with downstream separator membrane). Yet, if the tanks have already been contaminated with microorganisms, the microorganisms will be killed by using specific biocides. The prior art mentioned involves considerable construction and maintenance effort and does nevertheless not ensure absolute safety.

In a novel method of another embodiment of the invention, it is likewise of particular advantage to install the described filling bodies for the purpose of reducing the "surge" effect of liquids and liquid gases in tanks of vehicles (aircrafts, vessels, spacecrafts and ground vehicles), and to completely fill these tanks with the described filling bodies. When liquids are decelerated or accelerated, a liquid serves as "inert mass" which moves backwards during acceleration and forwards during deceleration, e.g. The same holds for curve driving where the centrifugal force causes displacement of the liquid towards the exterior of the bend. These sudden weight displacements of liquids and liquid gases during transports (e.g. also in case of heavy sea in ships) constitutes a particularly high and worldwide accident risk. Due to the instability caused by the surge effect, hazardous-material transporters frequently overturn on the street, and particularly ships with liquid gas loads capsize in case of correspondingly high sea since the liquid gas "builds up" heavily in a manner that the ship will "turn around its own axis". In the prior art, the negative effect of surge effects has been reduced by installing so-called "baffles". These are, mostly perforated, partition walls which are installed in the liquid containers, and operate so-to-speak as "wave breakers". These baffles are perforated and do not extend as far as to the top of the liquid container. Among others, baffles are likewise installed in fuel tanks of motor vehicles (in this case also for sound dampening of backward and forward-moving fuels), and in oil storage containers of the engine. With respect to the oil storage containers, the oil is thus prevented from moving towards one side, causing the oil intake socket to suck air and in this case interrupting engine lubrication. Yet, the efficiency of this technology is not satisfying, and hazardous-material transporters frequently overturn in bends of roads, as already mentioned above. Moreover, baffles are of a considerable weight, causing higher fuel consumption of the vehicle. This is why the invention suggests complete filling of the respective tank container with the inventively described filling bodies. Since each described filling body operates as a "mini-baffle" with a number of "wave breakers", thereby splitting the liquid load into various little and very little wave motions, thus preventing a large and difficult-to-handle "surge", and stabilizing the liquid reliably.

In a novel method of another embodiment of the invention, it is likewise of particular advantage to install the described filling bodies for dissipating static electricity in tanks containing fuels, chemical liquids and gases. For example in case of aircrafts, the static electricity is a considerable risk. A flying spark (which is produced by electric-load equalization) may result in the ignition of a gas-air mixture in the tank, and thus in an explosion. This is why the invention suggests filling of the complete tank with the inventively described filling bodies. The high conductivity of the described filling bodies allows for any static electricity to be immediately and permanently dissipated from the tank content so that flying sparks during load equalization will no longer be possible.

In a novel method of another embodiment of the invention, it is likewise of particular advantage to install the described filling bodies for protection against electromagnetic disturbances (EMDs) in tanks containing fuels, chemical liquids and gases, and to completely fill the tank to be protected with the described filling bodies. For example, in case of aircrafts, electromagnetic disturbances constitute a considerable risk since they may lead to disturbances of the vehicle electronics, which may consequently result in an aircraft crash due to malfunctions of all instruments. This is why the invention suggests filling of the complete tank with the described filling bodies. The high conductivity of the inventively described filling bodies protects the tanks, which contain fuels, chemical liquids and gases, and which are completely filled with the described filling bodies, against electromagnetic fields and disturbances.

In a novel method of another embodiment of the invention, it is likewise of particular advantage to install the described filling bodies for protection against BLEVE (boiling liquid expanding vapor explosion) in tanks with liquified, flammable gases, and to completely fill the tank to be protected with the inventively described filling bodies. The BLEVE is a gas explosion of an expanding and boiling liquid. BLEVEs may be caused particularly in case of pressurized-gas containers which include flammable liquified gas. For example in tank vehicles, BLEVEs pose a considerable risk since large explosions may result from an originally pretty harmless tank vehicle accident. In a BLEVE, gas escapes first through a leakage and burns smoothly, or the gas tank is subjected to an external energy source (e.g. fuel combustion of the tractive vehicle of a gas-tank trailer truck after an accident). This energy source strongly heats the gas tank and more and more gas evaporates within the same. Then, a pressure will be built up in the pressurized gas container which becomes larger and larger until the container walls, already weakened by the fire, crack. Here, large amounts of gas escape and ignite immediately, causing a large explosion in the form of a fireball which produces burning liquid gas dropping to earth. This is why the invention suggests filling of the complete tank with the filling bodies described according to the present invention. The particularly advantageous effect of the described filling bodies is that they substantially decelerate, and reduce, evaporation of liquids since the high heat dissipation of the described filling bodies will lead to a reduced vaporization and, moreover, to a recondensation of the gases on the described filling bodies in the closed container. The installation of the described filling bodies substantially reduces, and decelerates, pressure build-up in the gas tank in case of an accident so that there will be considerably more time for firefighters and rescue workers to extinguish the fire before a BLEVE, or to rescue and evacuate people.

In a novel method of another embodiment of the invention, it is likewise of particular advantage to insert the described filling bodies into gas containers, in particular gas bottles. Such gas containers, e.g. high-pressure gas bottles, are filled in a manner that the gas is introduced into the gas container under considerable compression. It is known that this compression to a certain pressure, in addition to desired compression of the filling gas, also causes an undesired temperature increase of the gas. This temperature increase is disadvantageous since it allows only for a smaller amount of filling gas to be introduced into the gas container to be filled at a predefined pressure and volume. Here, the invention suggests complete filling of the gas container with the described filling bodies according to claims 6 to 32. Thanks to the high conductivity of the described filling bodies, heat is effectively dissipated from the filling gas during filling. This cooling of the filling gas allows for a higher filling level to be achieved at a predefined pressure and volume.

In a novel method of another embodiment of the invention, it is likewise of particular advantage to fill the entire tank container with the described filling bodies according to any one of claims 6 to 32, and to use the described filling bodies for reducing liquid and gas-pressure peaks during filling of tank containers with liquids and gases. In particular when filling gas containers with filling gas, the pressure peaks lay a heavy strain on the interior walls of the container to be filled. Such pressure peaks arise from the fact that the filling gas is introduced into the gas container to be filled in the form of a directed jet and under high pressure. Here, the invention suggests complete filling of the gas or tank container with the described filling bodies since their geometrical shape and stability have the effect of splitting a gas or liquid jet into a number of several partial jets when filling the container, thus causing a substantial reduction of pressure peaks within the tank container and consequently a reduction of the pressure peaks acting on the interior walls of the container.

In a novel method of another embodiment of the invention, it is likewise of particular advantage to use the described filling bodies for heating or cooling of liquids and gases in tank containers or tubings. Usually, substances are transported in tank containers or tubings in the gaseous or liquid state. The aggregate state of thus-transported substances depends on the temperature. For example in case of a temperature drop, the transported substance is transformed into a more dense aggregate state. It is known that in case of gaseous substances, this leads to a condensate precipitation and to drop formation on the interior walls of the container, whereas liquid substances tend to "gel" (e.g. "gelling" of diesel fuel). Such occurrences are not desired and disadvantageous. Here, the invention suggests heating or cooling of the substance to be transported "from the inside", using the excellent conductivity of the described filling bodies according to any one of claims 6 to 32 by filling the complete tank container or the tubing with filling bodies according to any one of claims 6 to 32, and by providing a permanent heating or cooling pulse to one or several filling bodies, which pulse will be transferred from one filling body to the next. This heating or cooling pulse may be generated by a heating or cooling element which is provided outside of the tank container or the tubing via direct contact (with cooling or heating contact being established by a rod-shaped or annular conductor which penetrates the container or tubing wall) or via indirect contact (without penetration of the container or tubing wall, preferably by induction or a microwave field).

In a novel method of another embodiment of the invention, it is likewise of particular advantage to use the described filling bodies for reducing vaporization losses caused by vaporization and volatilization of liquids stored in movable tank containers of vehicles (ground vehicles, vessels, spacecrafts, and aircrafts) or non-movable tank containers (storage tanks). Such vaporization losses are a considerable issue, e.g. when transporting liquid fuels with tankships. The transport on water which sometimes takes several weeks, and the temperature acting on the ship from the outside, result in a strong vaporization of the liquid stored (e.g. gasoline). It is known that in such a case, the vaporization gases even have to be burned off on the ship so as to reduce the explosion risk. The vaporization losses lead to a reduction and loss of the load so that the recipient will be supplied with less cargo at the end of the transport than was loaded at the beginning of the transport. This is why the invention suggests complete filling of the tank containers with the inventively described filling bodies. The described filling bodies considerably decelerate vaporization and volatilization of the transported substances, thus reducing financial loss of the carrier.

FIGS. 1 to 3 and 11 and 12 illustrate embodiments of the invention, yet without being restricted to these embodiments, and the invention will be explained in even more detail with reference to the drawings.

In detail, in the drawing:

DESCRIPTION OF THE INVENTION

Figure 1:
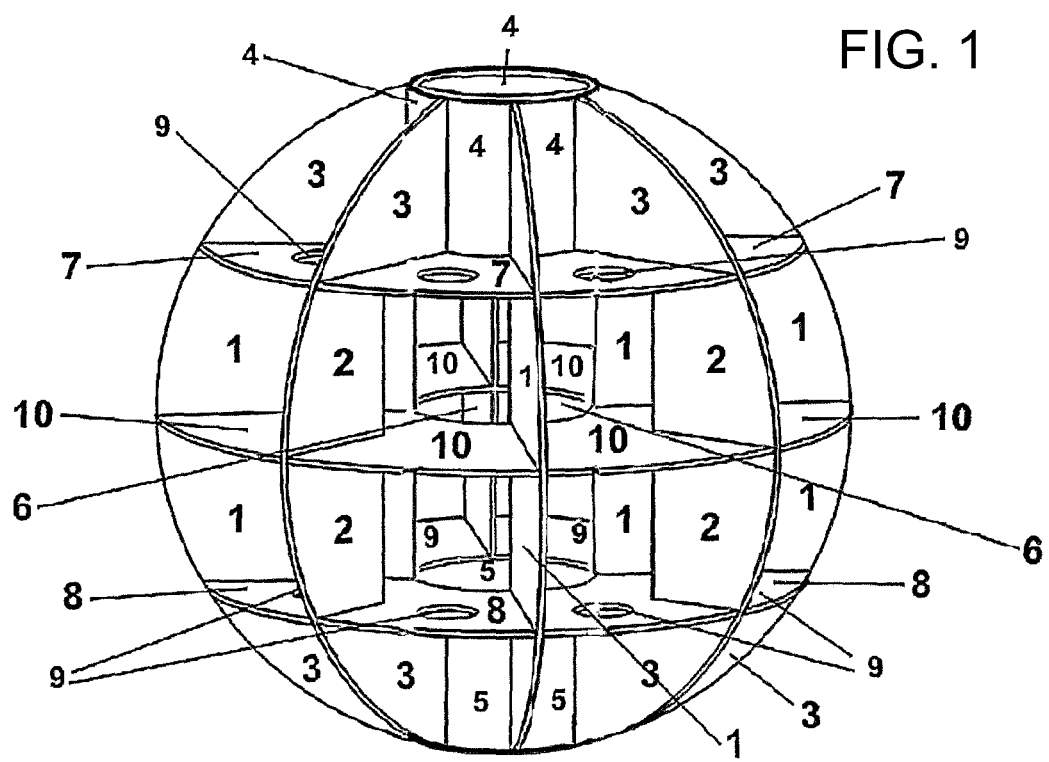
FIG. 1 shows a side view of the inventive spherical filling body.
Figure 2:
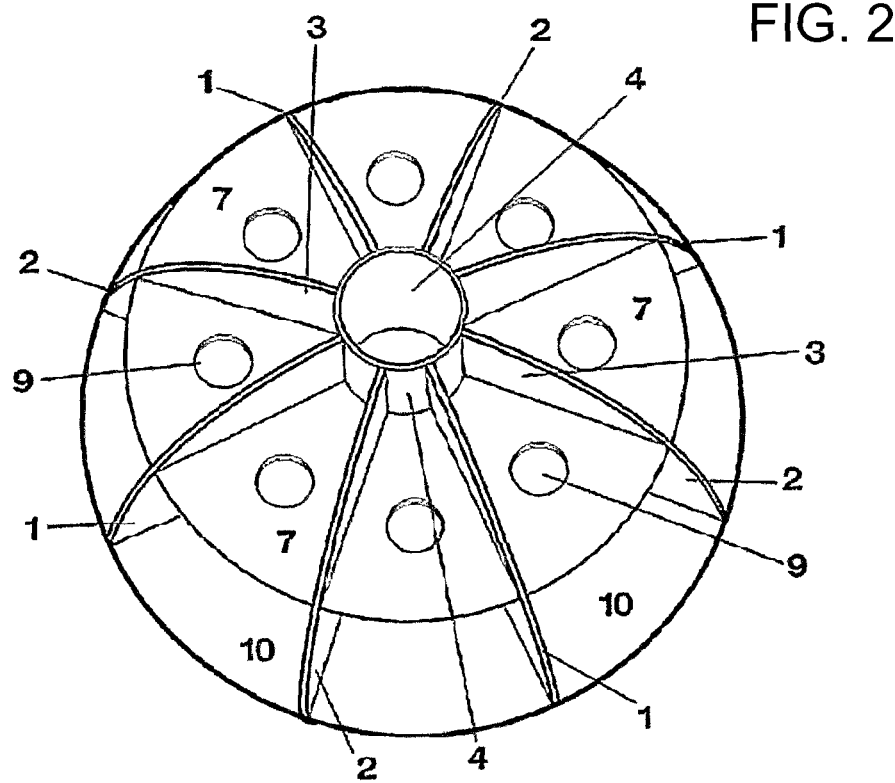
FIG. 2 shows a top view of an inventive spherical filling body.
Figure 3:
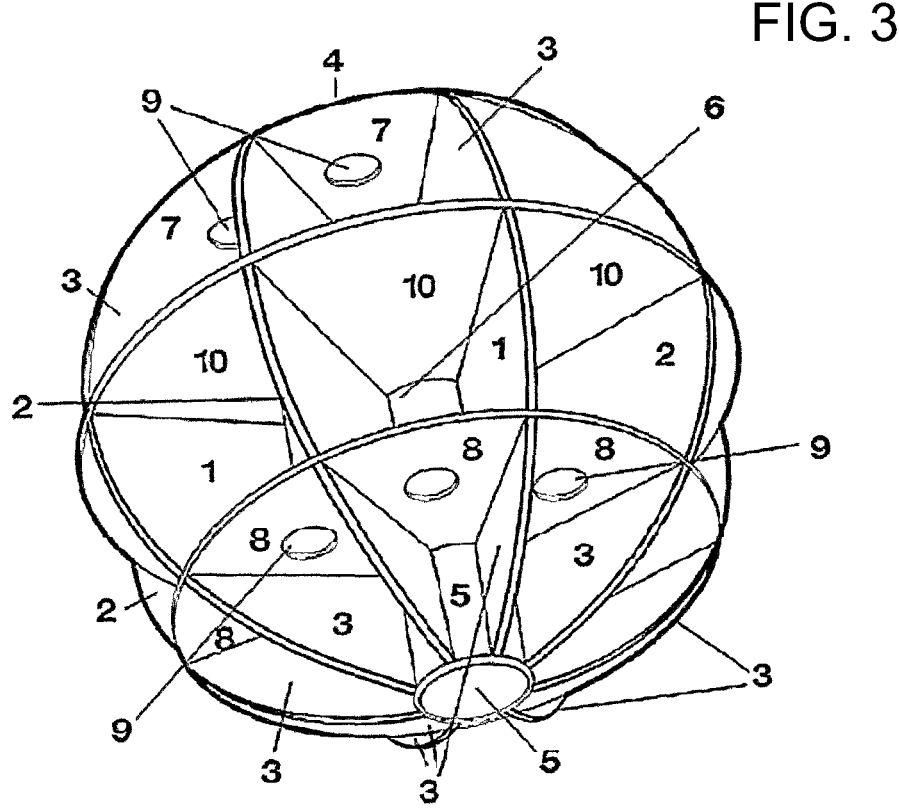
FIG. 3 shows a bottom view of an inventive spherical filling body.

FIGS. 1, 2 and 3 show an inventive spherical filling body which consists of several disk-shaped, circular vertical surfaces 1, 2 and 3, as well as of disk-shaped, circular horizontal surfaces 7, 8 and 10 running in parallel to each other. A circular opening 6 is provided in the center of the horizontal surface 10, which opening 6, together with the inwardly-open circular upper sleeve-shaped body 4 and the inwardly-open circular bottom sleeve-shaped body 5, forms an axially-continuous tube in a manner eccentric from top 4 to bottom 5, wherein the inside diameter of the sleeve-shaped and inwardly-open, circular bodies 4 and 5 and of the circular opening 6 are identical. The vertical surfaces 1 extend from the outer edge of the spherical body to the edge of the respective circular through-holes 4, 5 and 6 of the respective horizontal surfaces 7, 8 and 10 running in parallel and surrounding the through-holes. The vertical surfaces 2 extend from the outer edge of the spherical body as far as to half the distance between the outer edges of the spherical body on the horizontal surfaces 8 and 10 and between the edge of circular through-holes 5 and 6 of the horizontal surfaces. The vertical surfaces 3, on the top 4 and on the bottom 5, form the connection between the horizontal surfaces 7 and 8 and the sleeve-shaped bodies 4 and 5. Openings 9 are provided in the horizontal surfaces 8 and 7. These are arranged such that one opening 9 is provided in the horizontal surface 8 between the vertical surfaces 1 and 2, and one opening 9 is provided in the horizontal surface 7 between the vertical surfaces 3.

Figure 4:
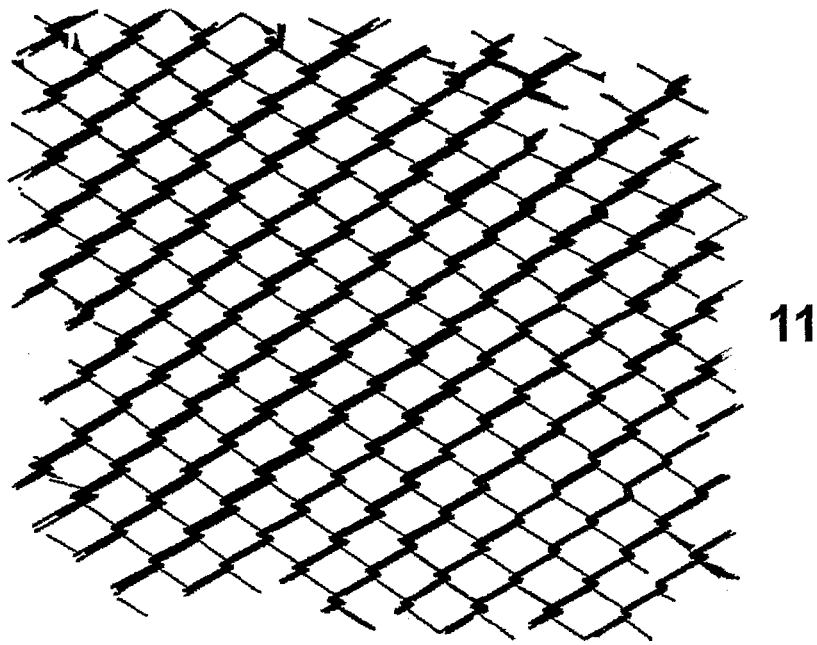
FIG. 4 shows a perspective of a prior-art stretched metal web.

FIG. 4 shows a representation of prior-art stretched metal 11.

Figure 5:
FIG. 5 shows perspectives of cylindrical and ellipsoidal, prior-art filling bodies made of stretched metal.
Figure 5:
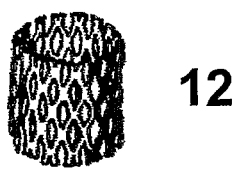
Figure 5:

FIG. 5 shows perspectives of cylindrical prior-art filling bodies 12 made of stretched metal.

Figure 6:
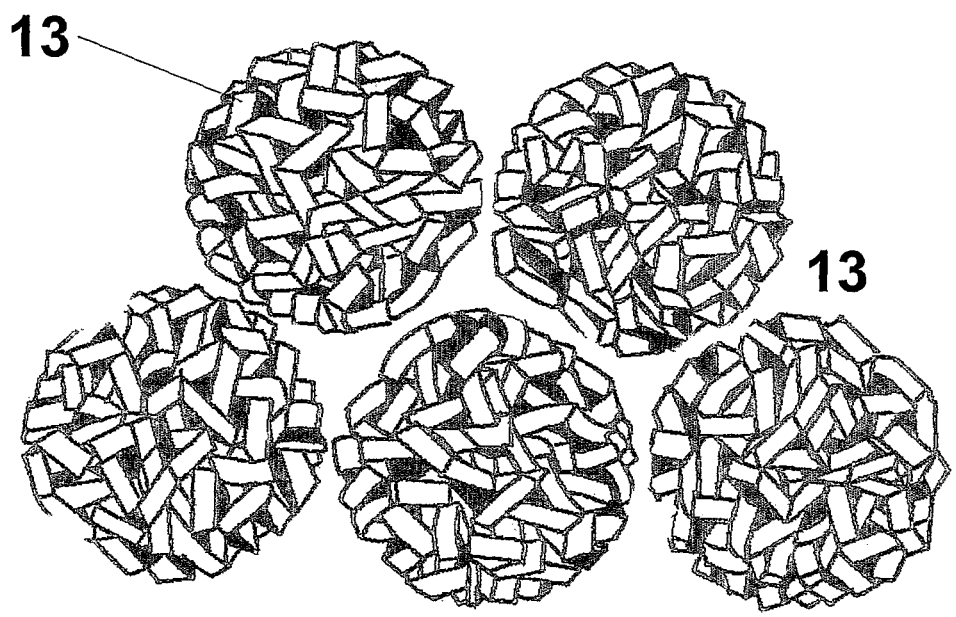
FIG. 6 shows a perspective of spherical prior-art filling bodies made of stretched metal.

FIG. 6 shows a perspective of the spherical prior-art filling bodies 13 made of stretched metal.

Figure 7:
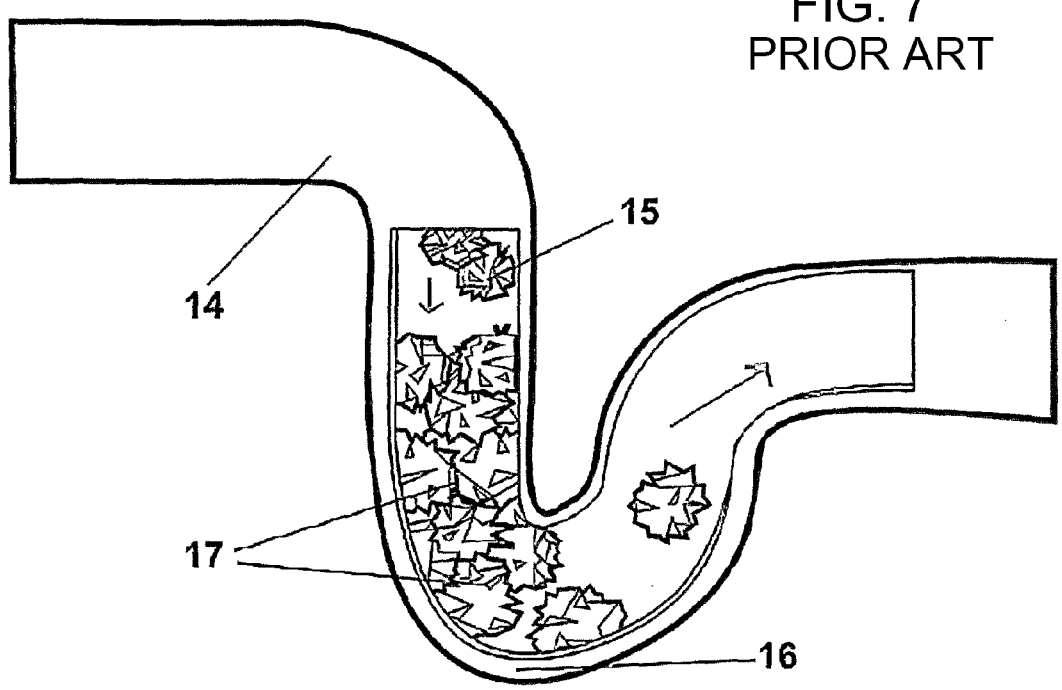
FIG. 7 shows a schematic partial view of a prior-art line tube with several spherical filling bodies made of stretched metal.

FIG. 7 shows a wound tubing 14 into which spherical prior-art filling bodies 15 made of stretched metal (e.g. bodies 12 and 13) are introduced, with the spherical filling bodies 15 being compressed, and jamming 17 several times at the tube winding 16.

Figure 8:
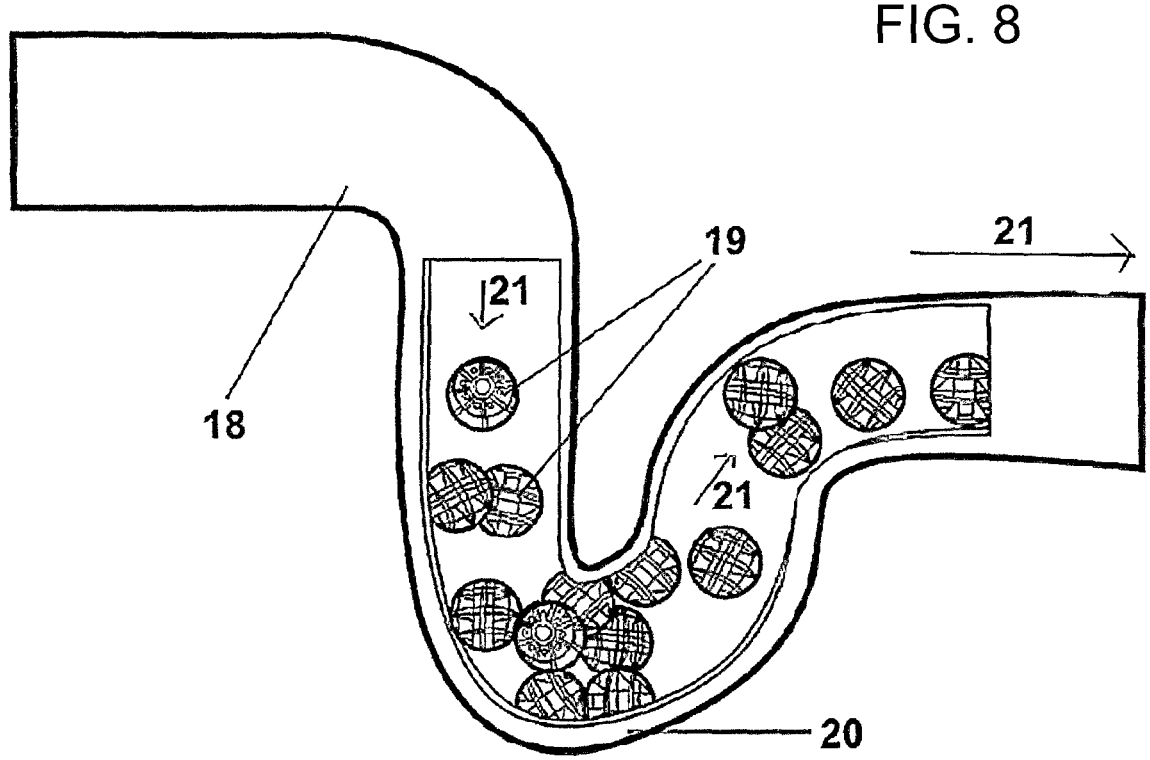
FIG. 8 shows a schematic partial view of a line tube with several inventive spherical filling bodies therein.

FIG. 8 shows a wound tubing 18 into which inventive spherical filling bodies 19 are introduced in direction 21, the filling bodies 19 smoothly passing the tube winding 20, and subsequently the tubing 18 in the direction 21.

Figure 9:
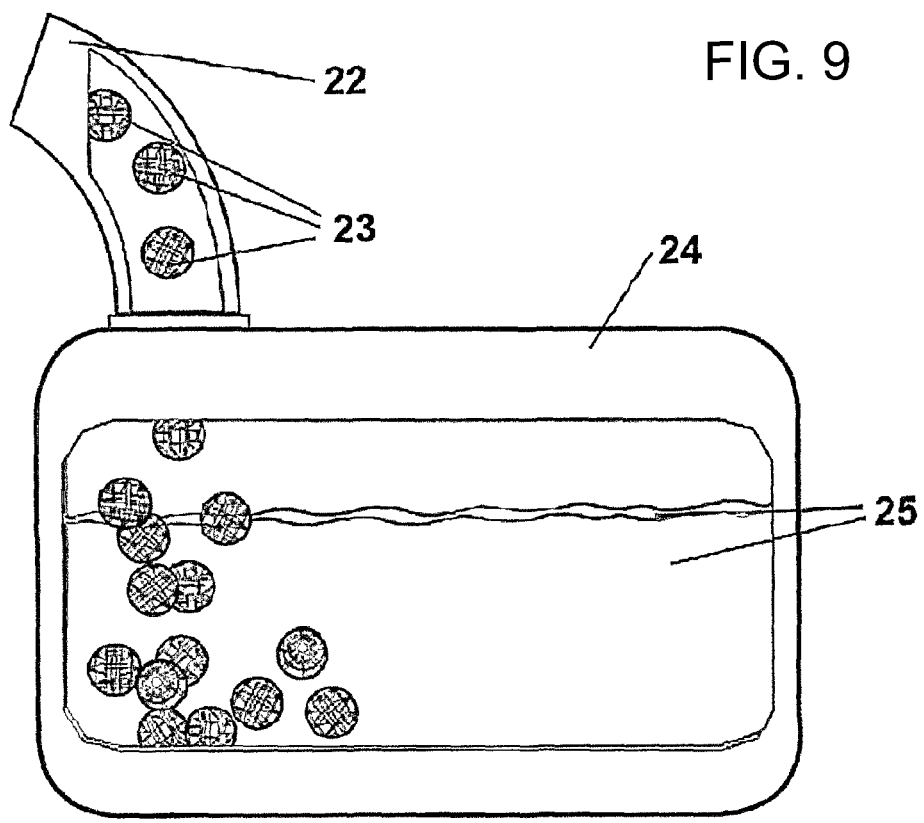
FIG. 9 shows a schematic partial view of a fuel tank with several inventive spherical filling bodies therein.

FIG. 9 shows a side view of the interior of the fuel tank 24 which is filled with fuel 25 to one half, and into which the inventive spherical filling bodies 23 are introduced via a fill-in socket 22.

Figure 10:
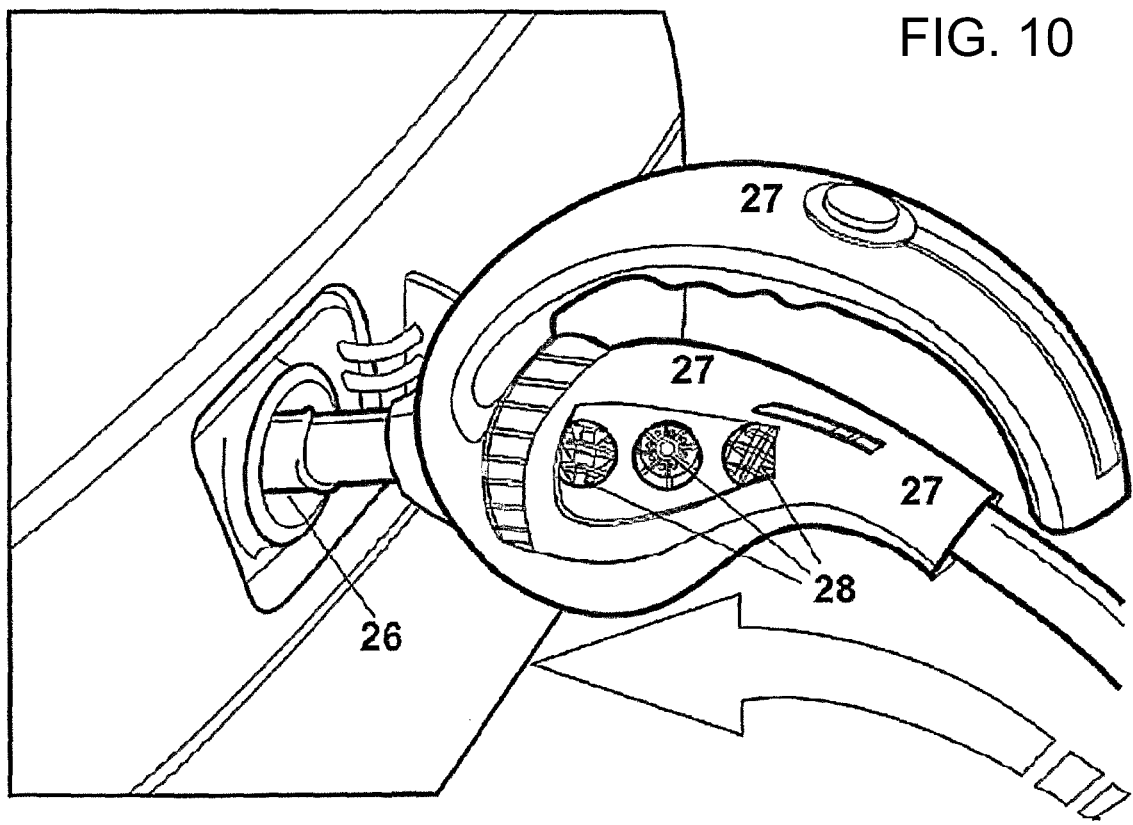
FIG. 10 shows a schematic partial view of an apparatus for filling a fuel tank of a passenger's vehicle, with several inventive spherical filling bodies being included.

FIG. 10 shows a basic representation of the tank fill-in socket 26 of a passenger's vehicle into which the inventive spherical filling bodies 28 are introduced by means of a blow-in device 27.

Figure 11:
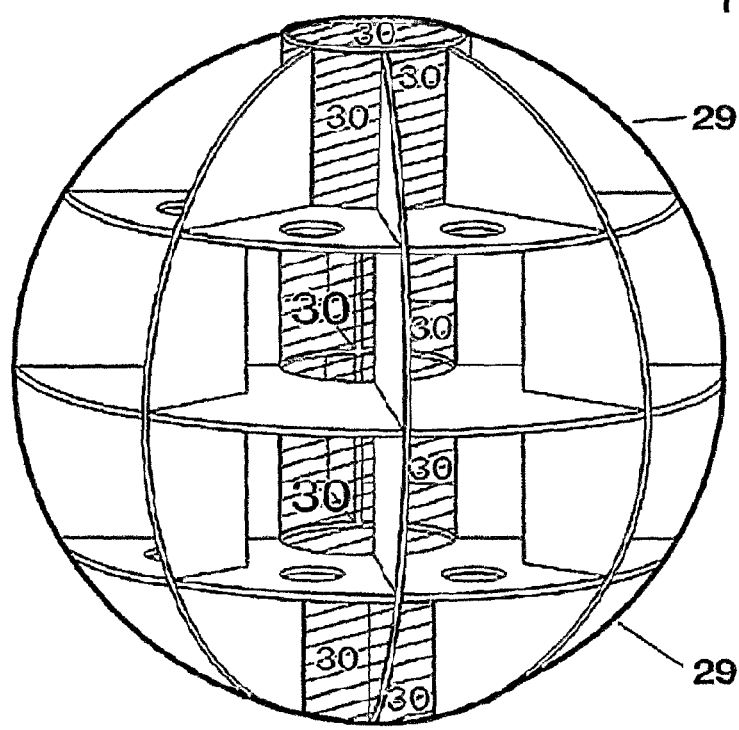
FIG. 11 shows a side view of an inventive spherical filling body, with the region for introducing a longitudinal and tubular hollow body being marked.

FIG. 11 shows a side view of the inventive spherical filling body 29 in which a tubular and axially-continuous opening 30, which is hatched, is provided.

Figure 12:
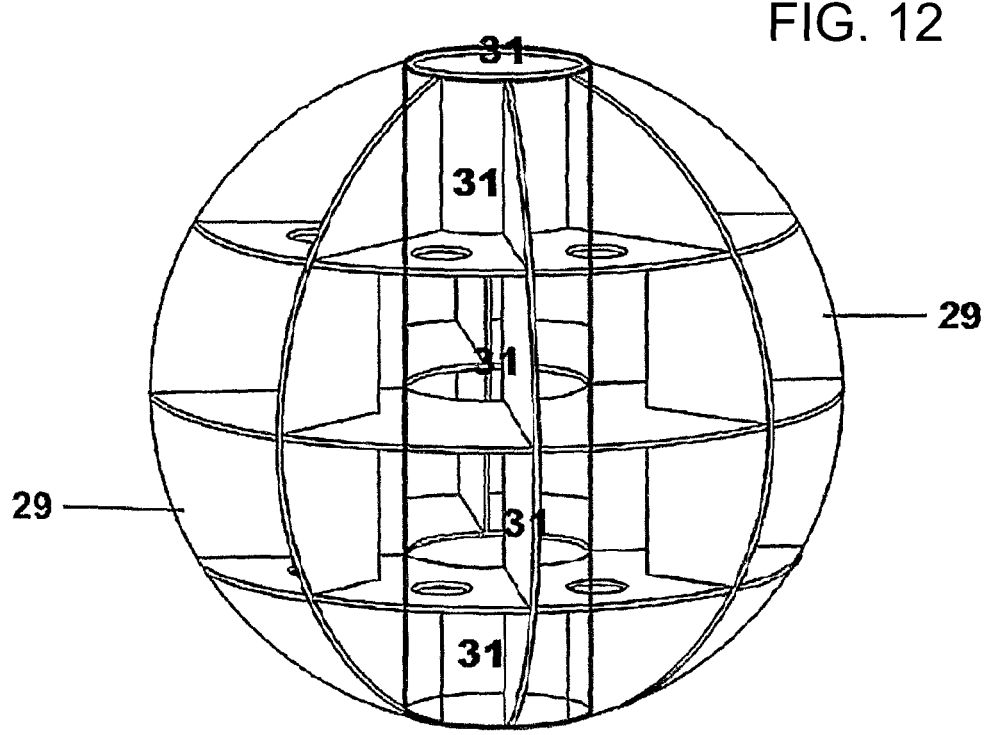
FIG. 12 shows a sketched side view of an elongated tubular hollow body.

FIG. 12 shows a longitudinal and tubular hollow body 31 which is arranged in the inventive filling body 29.

The invention claimed is:

1. A spherical, hollow filling body, comprising:
at least three disk-shaped vertical surfaces arranged concentrically and at a certain angle relative to each other; and
at least two disk-shaped horizontal surfaces are provided in parallel to each other and at a right angle to the vertical surfaces;
said horizontal surface having a circular opening formed therein in a center thereof, which opening, together with an inwardly-open upper sleeve-shaped body and an inwardly-open bottom sleeve-shaped body, forms an axially-continuous, tubular opening axially aligned from top to bottom, wherein an inside diameter of the sleeve-shaped and inwardly-open, circular bodies and of the circular opening are identical.

2. The filling body according to claim 1, wherein the vertical surfaces extend from their outer edge to the respective edge of the circular through-holes of the respective horizontal surfaces running in parallel and surrounding the circular through-holes.

3. The filling body according to claim 2, wherein the vertical surfaces extend from their outer edge as far as to half the distance between the outer edge of the vertical surface and the edge of the circular through-holes of the parallel-extending horizontal surfaces.

4. The filling body according to claim 3, wherein the vertical surfaces, on the top and on the bottom, form the right-angled connection between the parallel-arranged horizontal surfaces and the sleeve-shaped bodies.

5. The filling body according to claim 1, wherein the circular opening is one of a plurality of circular openings provided on the horizontal surfaces and arranged in a manner that there is one opening in the horizontal surface between the vertical surfaces, and one opening in the horizontal surface between the vertical surfaces.

6. A method of increasing stability and crash safety of containers with flammable and explosive liquids and gases in case of mechanical impacts on the container walls from the outside, characterized in that the container to be protected is filled substantially completely with filling bodies according to claim 5, and that this filling provides for an appropriate counterpressure to the pressure acting on the exterior walls from the outside.

7. A method of preventing implosions of tank containers, without forced ventilation systems, as well as of pipes and pressure tanks which are not vacuum-proof and whose safety valve is failing, characterized in that the tank containers, pipes and pressure tanks to be protected are filled substantially completely with filling bodies according to claim 5, and that when a negative pressure is created in the interior of the tank containers, pipes and pressure tanks to be protected when emptying the same, these filling bodies will counteract the external positive pressure of the atmosphere load acting on the container walls from the outside.

8. A method of enabling welding operations on filled or non-cleaned containers with flammable and explosive liquids and gases without the risk of explosions or strong deflagrations, characterized in that the containers with flammable and explosive liquids and gases are filled substantially completely with the filling bodies according to claim 5 before beginning the repair works.

9. A method of optimizing applications in chemical industry, in case of which it is primarily important to have filling bodies providing large surfaces at low flow resistance, characterized in that filling bodies according claim 5 are used therefor, and that these filling bodies according to claim 5 are installed, horizontally or vertically in pipes or columns.

10. A method of reducing the wave effect of liquids and liquid gases in movable tank containers of aircrafts, spacecrafts, vessels and ground vehicles, characterized in that the respective tank is filled substantially completely with filling bodies according to claim 5.

11. A method of dissipating static electricity in movable and stationary tank containers with fuels, chemical liquids and gases, characterized in that the tank container to be protected is filled substantially completely with filling bodies according to claim 5.

12. The filling body according to claim 1, wherein the entire filling-body surface is smooth or porous.

13. The filling body according to claim 1, wherein the entire filling body is coated with an alkaline bichromate.

14. A method of protecting containers for flammable liquids against corrosion, characterized in that a container to be protected is substantially completely filled with filling bodies according to claim 13, and that the bichromate causes removal of water from fuels and their containers.

15. The filling body according to anyone of claims 1 to 13, wherein a hollow body which is adapted precisely to the diameter and the length of the opening is introduced axially from top to bottom and fixed inside of the filling body, by strutting or gluing, and that the hollow body is provided with a flame-retardant filling.

16. The filling body according to claim 15, wherein the filling of the hollow body is a flame-retardant, fire-extinguishing gel which includes a polymer as an alkaline substance in which water is bound.

17. The filling body according to claim 15, wherein an outer sleeve of the hollow body consists of a thin wax layer which melts off and releases its content in case of fire.

18. The filling body according to claim 17, wherein the temperature threshold value of the wax layer of the hollow body is adapted to the respective field of application of the filling body.

19. A method of extinguishing fires of flammable liquids, characterized in that a container to be protected for flammable liquids is filled substantially completely with filling bodies according to claim 15, and that the wax layer of the hollow body melts off in case of fire and releases the fire-retardant active substance present in the hollow body to the burning environment.

20. The filling body according to claim 15, wherein the filling is selected from the group consisting of sodium bicarbonate, zinc borate or sodium borate, calcium bromide, calcium-chloride dihydrate, calcium-chloride hexahydrate and oleates.

21. The filling body according to anyone of claims 1 to 13, wherein a hollow body which is adapted precisely to the diameter and the length of the opening is introduced axially from top to bottom and fixed inside of the filling body, by strutting or gluing, and in that an active or passive RFID (radio frequency identification) transponder chip is provided in the hollow body.

22. A method of integrating an active or passive RFID (radio frequency identification) transponder into a filled or non-filled tank container, characterized in that one or several filling bodies according to claim 21 is introduced into the tank container, and that the data of the transponders integrated in the filling body is receivable from the outside, and readable, by means of mobile or stationary reading devices without destroying or damaging the filled or non-filled container.

23. The filling body according to anyone of claims 1 to 13, wherein a hollow body which is adapted precisely to the diameter and the length of the opening is introduced axially from top to bottom and fixed inside of the filling body, by strutting or gluing, and in that the hollow body consists of a buoyant and flame-resistant foam material as a buoyancy means for the filling body and, depending on the field of application, is divided into chambers which are filled with different substances at the same time, part thereof with fire-extinguishing gel and part thereof with buoyant foam plastic.

24. A method of protecting containers for flammable liquids against explosion-type burning processes, characterized in that filling bodies according to claim 23 are applied in gapless manner to the surface of flammable or explosive liquids in tank containers in one or several floating layers, and that this single or multi-layered barrier on the surface of the liquid acts as an igniting barrier between liquid and gas/air space in the tank container.

25. A method of extinguishing fires from flammable liquids, characterized in that filling bodies according to claim 23 are applied in substantially gapless manner to the surface of burning liquids in one or several floating layers in case of fire.

26. A method of reducing carbon-hydrogen emissions which arise from evaporation, vaporization or volatilization of liquids or liquid gases stored in movable tank containers of vehicles or non-movable tank containers, characterized in that one or several layers of the floating filling bodies according to claim 23 are applied to the surface of the liquid stored.

27. The filling body according to anyone of claims 1 to 13, wherein a hollow body which is adapted precisely to the diameter and the length of the opening is introduced axially from top to bottom and fixed inside of the filling body, by strutting or gluing, and that the hollow body consists of material which swells up strongly in case of heat.

28. A method of creating an impermeable ignition and flame barrier in dome shafts, cavities, rear-ventilated facades, air conditioners and pipes, characterized in that the dome shafts, cavities, rear-ventilated facades, air conditioners and pipes to be protected are filled substantially completely, or in sections, with filling bodies according to claim 27.

29. A method of creating a bacteria barrier in air conditioners, characterized in that filling bodies according to claim 27 are installed in the shafts of the air conditioner to be protected in a manner that the air-conditioner shaft is filled substantially completely or in sections.

30. The filling body according to claim 1, wherein the entire filling body is coated with a noble metal.

31. A method of preventing bacteria and fungi in tank containers, characterized in that the tank container is filled substantially completely with filling bodies according to claim 30.

32. The filling body according to claim 1, wherein the entire filling body is provided with an antibacterial and/or antifungal outer functional coating.

33. A method of filling tank containers with liquid and gaseous fuels, which comprises the steps of:
    providing a spherical, hollow filling body according to claim 1; and
    introducing the spherical, hollow filling body into the tank containers together with liquid or gaseous substances, via present fill-in openings by means of suitable blow-in devices, or sucked off the same by appropriate sucking devices for maintenance.

34. A method of protecting containers for flammable liquids or gases against explosion-type burning processes, characterized in that a container to be protected is filled substantially completely with filling bodies according to claim 1.

35. A method of creating an air-permeable flame and ignition barrier in dome shafts, cavities, rear-ventilated facades, air conditioners and pipes, characterized in that the dome shafts, cavities, rear-ventilated facades, air conditioners and pipes to be protected are filled substantially completely, or in sections, with filling bodies according to claim 1.

36. A method of reducing carbon-hydrogen emissions which arise from evaporation, vaporization or volatilization of liquids or gases stored in movable tank containers of vehicles or non-movable tank containers, characterized in that the movable or non-movable tank container is filled substantially completely with filling bodies according to claim 1.

37. A method of reducing the boil-off effect of hydrogen, characterized in that an entire hydrogen tank is filled with filling bodies according to claim 1.

38. A method of protecting tank containers with fuels, chemical liquids and gases against electromagnetic disturbances (EMDs), characterized in that the tank container to be protected is filled substantially completely with filling bodies according to claim 1.

39. A method of reducing, and delaying, the BLEVE (boiling liquid expanding vapor explosion) effect in tank containers with liquified flammable gases, characterized in that the tank container to be protected is filled substantially completely with filling bodies according to claim 1.

40. A method of increasing filling capacity when filling gas containers at a predefined volume and pressure of the gas container, characterized in that the empty gas container is filled substantially completely with filling bodies according to claim 1.

41. A method of reducing liquid and gas-pressure peaks when filling tank containers with liquids and gases, characterized in that the entire tank container is filled substantially completely with filling bodies according to claim 1, and that these filling bodies split a gas or liquid jet into a number of partial jets when filling the tank container, thus causing a substantial reduction of pressure peaks within the tank container and consequently a reduction of the pressure peaks acting on the interior walls of the tank containers.

42. A method of heating or cooling liquids and gases in tank containers or pipes, characterized in that the entire tank container or pipe is filled with filling bodies according to claim 1, and that at least one filling body according to claim 1 is in direct cooling or heating contact with a cooling or heating element, the latter being provided outside of the tank container or the pipe, with the cooling or heating contact being established by means of a rod-shaped or annular conductor penetrating the tank container or pipe wall.

43. A method of heating or cooling liquids and gases in tank containers or pipes, characterized in that the entire tank container or pipe is filled with filling bodies according to claim 1, and that at least one filling body is heated by a heat source outside of the tank container or pipe without penetration of the container or pipe wall, by way of induction or a microwave field.

44. A method of reducing vaporization losses caused by vaporization of liquids stored in movable tank containers of vehicles or non-movable tank containers characterized in that the movable or non-movable tank container is filled completely with filling bodies according to claim 1.

* * * * *